UNITED STATES PATENT OFFICE.

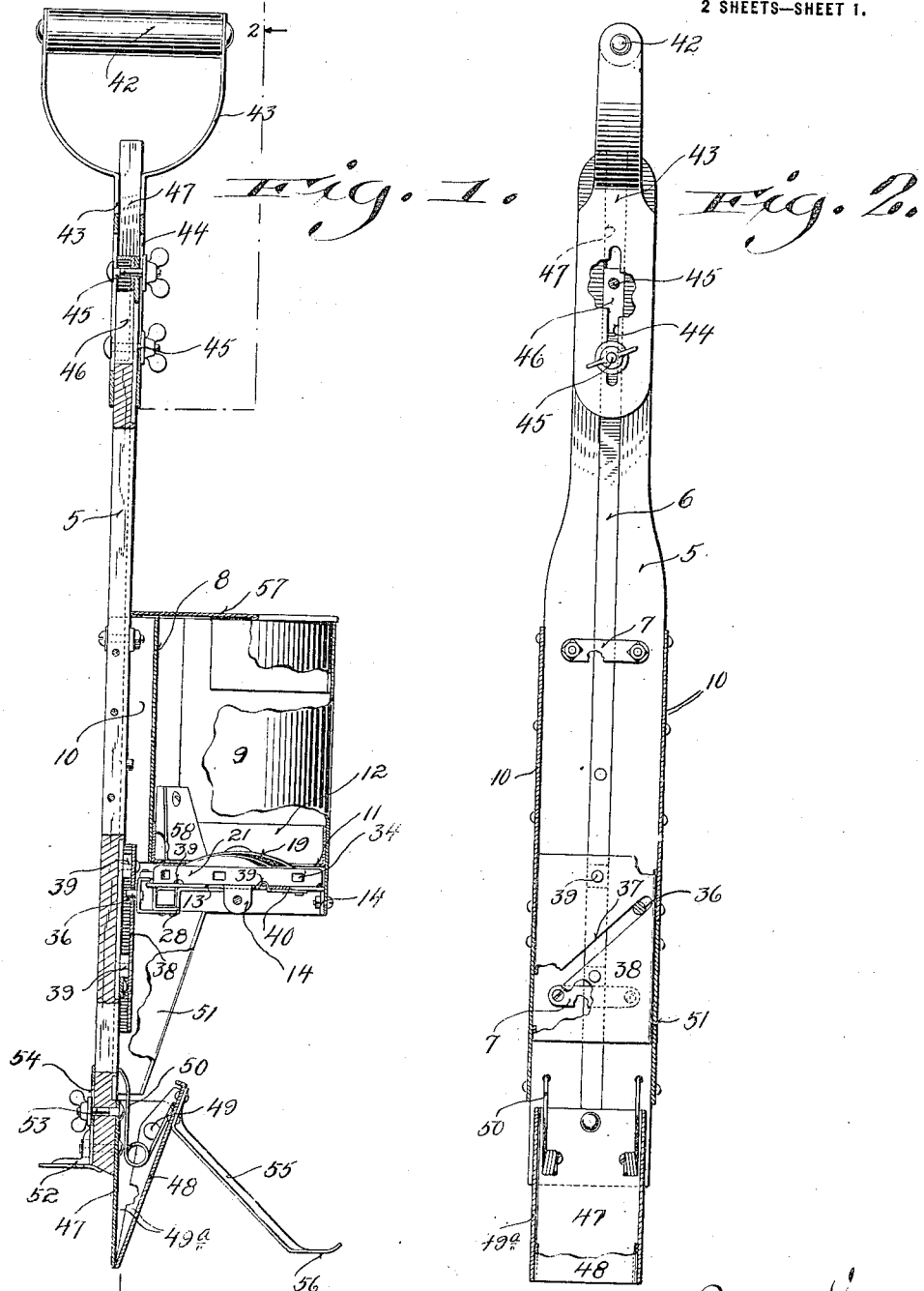

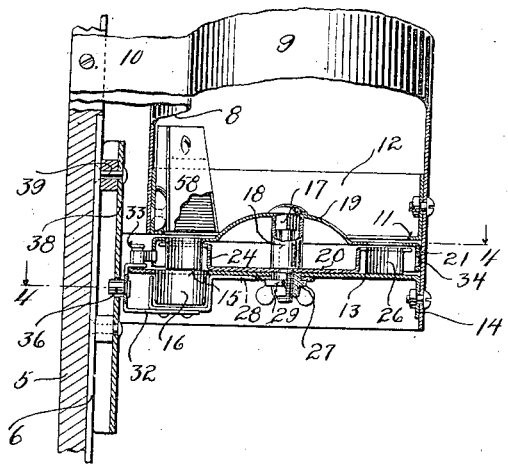
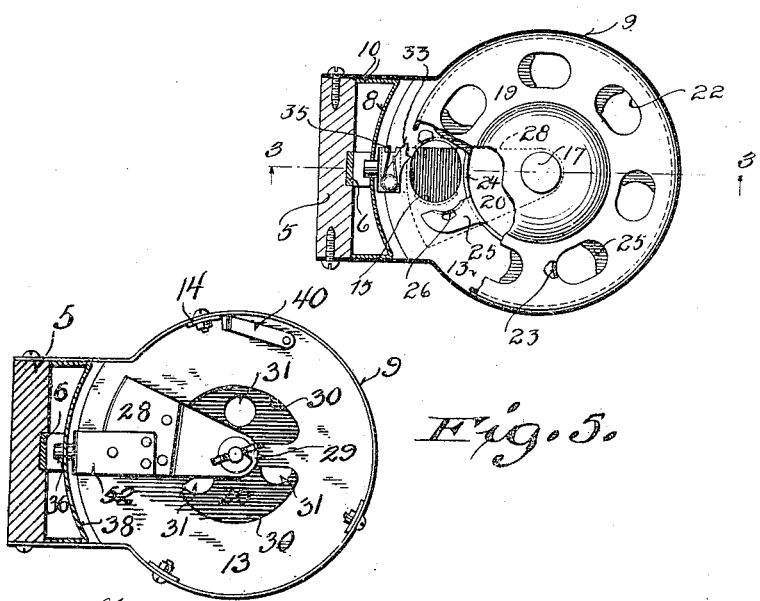

WILLIAM G. BOLUS, OF CORLISS, WISCONSIN, ASSIGNOR TO JOHN T. WEBERS, OF RACINE JUNCTION, WISCONSIN.

MANUALLY-WIELDED SEEDER.

1,252,542.  Specification of Letters Patent.  Patented Jan. 8, 1918.

Application filed November 2, 1916. Serial No. 129,097.

*To all whom it may concern:*

Be it known that I, WILLIAM G. BOLUS, a citizen of the United States, and resident of Corliss, in the county of Racine and State of Wisconsin, have invented certain new and useful Improvements in Manually-Wielded Seeders; and I do hereby declare that the following is a full, clear and exact description thereof.

The present invention relates to new and useful improvements in seeders, more particularly of that hand wielded type adapted to be pressed into the ground to deposit seeds therein, and actuated for discharge of successive batches of seed by its successive ground engaging movements.

It is in general the object of the present invention to simplify the structure and improve the efficiency of devices of this nature.

It is more particularly an object to provide improved and simple means for actuating the rotatable base portion of the seed receptacle to permit successive discharges of seeds therefrom.

It is further an object to provide a simple and readily adjustable means for varying the size of the discharge openings of the seed receptacle bottom.

It is still further an object to provide a seed holding pocket at the ground engaging end of the apparatus which is actuated to open position in the lower portion of its ground piercing movement whereby the necessity of an excessive tilting of the device to open the pocket is eliminated.

A still further object resides in the provision of a simple and readily actuated means for adjusting the handle of the device to adapt the device for convenient use by persons of different heights.

With the above and other objects and advantages in view the invention resides more particularly in the novel combination, arrangement and formation of parts more particularly hereinafter described and particularly pointed out in the appended claims.

In the drawings:

Figure 1 is a side elevational view of a hand wielded seeder constructed in accordance with the present invention with the seed receptacle and other portions broken away to more clearly disclose the structure.

Fig. 2 is a vertical sectional view of the seeder as indicated by the line 2—2 of Fig. 1.

Fig. 3 is a vertical and enlarged sectional view through the bottom of the seed receptacle as indicated by the line 3—3 of Fig. 4.

Fig. 4 is a horizontal sectional view therethrough on the line 4—4 of Fig. 3.

Fig. 5 is a bottom plan view of the seed discharging mechanism.

Referring now more particularly to the accompanying drawings, the device comprises a body staff 5 which is longitudinally slotted for reception of an actuating rod 6 extending from its upper end to the seed release mechanism, this rod being held against displacement by transversely disposed strips 7 secured to the staff.

The seed receptacle, which is disposed at the intermediate portion of the staff, comprises an inner section 8 in the form of a minor arc having its chord equal to the width of the staff, and an outer section 9 in the form of a major arc curved concentrically with the inner receptacle section, and having its edges abutting the edges of said section, both sections being secured to the staff by coextensive flanges 10 bolted to the sides of the staff, the cylindrical receptacle thus formed being held spaced from the shaft for movement therebetween of suitable operating means later to be described.

The lower edge of the inner wall section 8 terminates short of the corresponding edge of the outer section 9 to provide a clearance for suitable actuating mechanism, and at the plane of the lower edge of the inner section there is provided an inwardly extending flange 11 carried by a band 12 disposed within the cylinder and incidentally serving to retain the proper alinement of the edges of the wall portion thereof. Disposed below and in spaced relation to the flange 11 is a bottom plate 13 fixedly secured to the extended outer wall section by spaced depending lugs 14 at its periphery, this plate extending inwardly of the cylinder and being provided within the inner portion of the periphery of the cylinder with a discharge opening 15 having depending wall portions 16.

To provide seed holding pockets for receiving seeds from the main supply in the cylinder and conveying them to the discharge opening 15 at the bottom plate, a pivot bolt 17 is passed centrally through and journaled in the bottom plate 13 and held in spaced relation on this bolt by a sleeve 18 are upper and lower pocket plates 19 and 20 respectively. The central portion of the upper plate is upwardly bulged to direct seeds to the peripheral portion thereof, and the peripheral portion of the plate is provided with a depending flange 21 which extends substantially between the flange 11 and the bottom plate 13. This top plate is also provided adjacent its periphery with an annular series of openings 22 adapted to successively aline with the opening 15 of the bottom plate, these openings being elongated circumferentially of the plate, and being each provided at one end with a depending wall plate 23 extending to the bottom plate 13. The lower pocket plate terminates inwardly of the openings 22 in an up-standing annular flange 24 and projecting radially from the upper edge of this flange at the ends of the openings 22 opposite their walls 23 are flat arms 25 having depending wall sections 26 at their edges adjacent the corresponding openings. The flanges 21 and 24 of the pocket plates together with the wall portions 23 and 26 carried thereby thus define annular series of pockets open at their tops and closed at their bottoms by the bottom plate 13 except when disposed over the opening 15 thereof.

To adjust the sizes of the pockets to adapt the device for use with various different kinds of grain it is merely necessary to relatively rotate the pocket plates 19 and 20 to project the arms 25 inwardly of the mouth openings 22 of the pockets. The plates are held against relative movement to retain desired adjustments thereof by a thumb nut 27 threaded on the lower end of the bolt 17 and adapted to abut the lower pocket plate 20, the inner end of this thumb nut being cylindrical and forming a journal for the entire pocket structure, the thumb nut forming also the journal for a radial plate 28 under the plate 13 and being provided with an annular rib 29 to hold the various plates in assembled relation, yet in a sufficiently loose manner to permit free rotation of the pocket structure and the plate 28 relative to the bottom plate 13. This plate 28 has its outer or free end portions bent into substantially U-shape as clearly shown in Fig. 3 so as to receive the walls 16 depending from the opposite edges of the opening 15. A pocket is thus formed to receive any grain which may drop through the opening 15 while the plate is directly beneath the same.

To permit access to the lower pocket plate 20 for adjusting it, the bottom plate is provided at both sides of the pivot bolt with openings 30 and the lower pocket plate is provided with an annular series of grip openings 31 movable across the openings 30. Thus to adjust the capacity of the pockets the thumb screw 27 would be loosened, the operator's hand would be inserted in the cylinder to hold the upper pocket plate 19, and the lower pocket plate would be rotated to project its arms 25 a desired distance inwardly of the pocket mouth openings 22, the nut then being tightened to retain this desired adjusted relation.

Entering now into the means for imparting successive rotative steps to the pocket structure, the pivotally mounted plate 28, which incidentally is formed at its outer end with a channel receiving the wall portions 16 of the bottom plate 13 to normally shut off the discharge of seeds, carries the outwardly and upwardly projecting arm 32 which terminates in an inwardly turned lip carrying a pivoted pawl 33 engageable selectively in a series of openings 34 in the depending flange 21 of the upper pocket plate and resiliently urged to such engagement by a spring 35. A boss 36 projects outwardly from the arm 32 and this boss is engageable in a slot 37 extending diagonally in a plate 38 secured to the body staff and curved to correspond to the curvature of the path of movement of the boss.

Thus, upon reciprocating the rod 6, the pawl 33 will be oscillated to impart successive rotative movements to the pocket structure, each of the openings 34 engageable by the pawl corresponding in number and position to the pockets to procure their successive alinements with the openings 15 of the bottom plate. To prevent undesired movement of the pocket structure a spring pawl 40 is secured at one end to the bottom plate 13 and has its other end projecting therethrough and engageable selectively in a series of notches 41 in the lower edge of the flange 21 of the pocket structure.

The upper end of the actuating bar 6 is connected with a handle comprising a grip bar 42 having depending end plates 43 which slidably fit against the side faces of the upper end of the main staff 5 and are provided with longitudinal slots 44 through which are passed clamping bolts 45 which also pass through the upper end of the actuating bar 6 and through a block 46 slidable in a longitudinal slot 47 in the staff, thus the handle grip may be adjustably clamped to the bar 6, to adapt the device for persons of different heights without affecting the desired free sliding movement of the handle with respect to the staff.

Ground piercing means are carried at the lower end of the staff and thus in the operation of the device as such means is pressed into the ground, the handle which is normally raised relative to the staff will be depressed to procure a movement of the cam slot 38 relative to the staff and rigidly associated structure which will swing the pawl carrying plate 28 to rotate the pocket structure and to simultaneously move the channel of said plate under the opening 15 of the bottom plate whereby the seeds contained in one of the pockets will be disposed in the chamber formed by the channel portion of said plate and the depending wall portion 16 of the bottom plate. Upon lifting the device from the ground the handle will be shifted to its outward position by the gravity load of the device and to the pawl carrying plate will be imparted a retrograde movement to procure its initial position for actuating the pocket structure and to move its channel portion laterally of the opening 15 of the bottom plate, to permit seeds to drop from the compartment formed in conjunction thereof.

The ground piercing means of the present device comprises a plate 47 fixedly secured to a projecting bolt on the lower end of the staff, and a plate 48 pivotally connected with the first plate by pivot pins 49 passed through flange portions 49ª at the side edges of said plates, said plates being normally urged together at their lower ends by springs 50 engaging the staff and the outer plate above its pivot, to form a normally closed seed receiving pocket. Seeds are delivered to this pocket from the outlet of the receptacle through a tapered chute casing 51 which also serves to house the operating mechanism of the pocket structure.

The outer face of the lower end portion of the staff carries a ground abutting shoe 52 which limits the piercing movement of the pocket in the ground, and this shoe is adjustably secured by a clamping bolt 53 passed through a longitudinal slot 54 in its attaching portion.

To swing the plates apart to thus open the pocket formed thereby and dispose seeds in the ground an arm 55 projects angularly outwardly from the pivot plate 48 and terminates in the ground engaging shoe 56 disposed below the ground abutting stop shoe 52. Thus as the pocket is urged to its desired limit of movement in the ground the shoe 56 will engage the ground and open the pocket at its bottom to dispose of the seed.

From the foregoing it is seen that a readily operated and comparatively simple hand wielded device has been provided for planting seeds in the ground.

The seed receptacle is closed by a flanged cover plate 57 which extends inwardly of the inner receptacle wall section 8 to close the space between it and the staff. Carried by the receptacle wall is a shield 58 disposed over the opening 15 of the bottom plate 13 to prevent flow of seeds through the pockets from the receptacle when said pockets are alined with the opening 15.

While the present description and drawings show a preferred form of my invention it will be appreciated that under differing conditions various changes and modifications may be resorted to without departing in any manner from the spirit of the invention and the invention is therefore to be limited only by the scope of the appended claims.

What is claimed.

1. A seeder of the class described including a staff having its upper end bifurcated to provide an open end slot, a seed receptacle, means for discharging seeds from said seed receptacle, a bar connected with said means for actuating the same, said bar being slidably carried by the staff, a handle adjustably connected with the outer end of the bar, said handle comprising side portions slidable at the sides of the slot in the staff and provided with longitudinal slots, a block disposed in the slot of the staff and slidable therein, and a clamping bolt passed through said handle side portions, the block and the upper end of the bar.

2. A seeder comprising a seed receptacle having a bottom provided with a single seed discharge opening, depending walls secured to the opposite edges of said opening and extending beyond the bottom of the receptacle, a pivot element extending from the center of the bottom of the receptacle, and a radial plate pivoted on said element, the free end portion of said plate being substantially U-shape to receive the depending walls of the discharge opening to close the same, a feeding member movable within the receptacle to convey seeds to said opening, and means for simultaneously moving said feeding member and removing the radial plate from beneath the discharge opening.

3. A seeder comprising a staff, a seed receptacle mounted thereon and having a single seed discharge opening formed in its bottom, depending walls extending from opposite edges of said opening, a pivot element projecting from the center of the bottom of said receptacle, a radial plate pivoted on said element, the outer end of said plate being substantially U-shaped to receive the wall depending from said discharge opening and to close the latter, an arm secured to the bottom of said U-shaped portion of said radial plate, a reciprocating means on said staff, a seed feeding member movable within the receptacle to convey the seeds to said discharge opening, and a connection between said reciprocating member, said arm and said feeding member whereby to simultaneously operate said feeding member and radial plate when the reciprocating member is moved.

4. A seeder comprising a seed receptacle having a bottom provided with a single seed discharge opening, an upper pocket plate disposed above the bottom of the receptacle and provided adjacent its periphery with an annular series of openings adapted to selectively aline with the opening in the bottom plate, a depending wall portion at one end of each opening, a depending flange formed on the periphery of said upper pocket plate and provided with an annular series of openings, a lower pocket plate between the upper pocket plate and the bottom of the receptacle, an up-standing annular flange on said plate inwardly of the openings in the upper pocket plate, arms extending radially from the upper edge of said plate and adapted to be adjustably moved inwardly of said openings, a depending wall carried by each of said arms, a pawl adapted to engage the openings within the depending flange to rotate said pocket plates, and means for actuating said pawl.

In testimony that I claim the foregoing I have hereunto set my hand at Corliss, in the county of Racine and State of Wisconsin, in the presence of two witnesses.

WILLIAM G. BOLUS.

Witnesses:
 JOHN P. OLH,
 NATHAN FREEMAN.